United States Patent [19]

Furukawa et al.

[11] Patent Number: 6,134,206
[45] Date of Patent: Oct. 17, 2000

[54] RECORDING AND REPRODUCING DEVICE

[75] Inventors: Hirofumi Furukawa, Katano; Yoshiyuki Hashimoto, Neyagawa; Toshio Yoshimatsu, Hirakata; Yoshiaki Nakatsuka, Osaka, all of Japan

[73] Assignee: Matsushita Electric Industrial Co., Ltd., Japan

[21] Appl. No.: 09/107,476

[22] Filed: Jun. 30, 1998

[51] Int. Cl.[7] .................................................. G11B 33/04
[52] U.S. Cl. .......................................................... 369/77.2
[58] Field of Search .................................. 369/77.2, 75.2, 369/270

[56] References Cited

U.S. PATENT DOCUMENTS

| | | | |
|---|---|---|---|
| 5,533,000 | 7/1996 | Koizumi | 369/270 |
| 5,812,511 | 9/1998 | Kawamura et al. | 369/77.2 |
| 5,867,338 | 2/1999 | Ohira et al. | 369/75.2 |
| 5,933,400 | 8/1999 | Kabasawa | 369/77.2 |

FOREIGN PATENT DOCUMENTS

6-275047  9/1994  Japan .

*Primary Examiner*—George J. Letscher
*Assistant Examiner*—Angel Castro
*Attorney, Agent, or Firm*—Parkhurst & Wendell, L.L.P

[57] ABSTRACT

The present invention has an object to provide a recording and reproducing device which can be used both for a cartridge disk (6) and for a cartridge-less disk (3) and reduced in size and weight, and which is capable of aligning a cartridge-less disk (3). A disk holder (14) adapted to set a cartridge disk (6) therein is provided on one and the other sides thereof with positioning means adapted to abut against a cartridge-less disk (3) set in the disk holder (14) to prevent it from moving to the innermost region R of the disk holder (14) and align it in a position corresponding to a rotational driving device (9), said positioning means being in the form of a CD stopper (20) and a step (30) formed in a shutter opener lever (19), thereby supporting and aligning the disk (3).

8 Claims, 14 Drawing Sheets

RECORDING AND REPRODUCING DEVICE

FIELD OF THE INVENTION

The present invention relates to a recording and reproducing device for recording and reproducing a cartridge disk or a cartridge-less disk.

BACKGROUND OF THE INVENTION

As cartridge disk, there are a recording medium generally called PD and another called MD.

As cartridge-less disk, there is a compact disk, called CD, for reproducing music and for reproducing images.

Figure 12A:
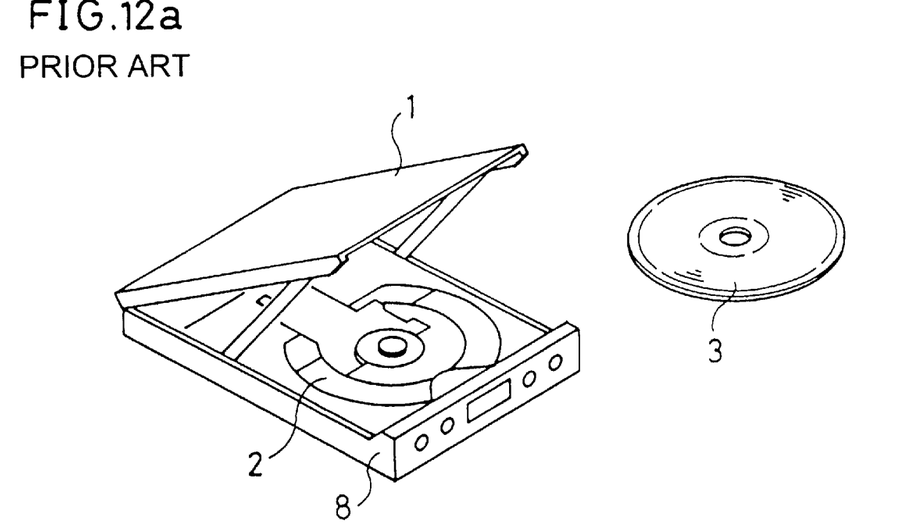
FIGS. 12a–12c are views for explaining successive loading steps in a conventional recording and reproducing device used exclusively for cartridge-less disks.
Figure 12B:
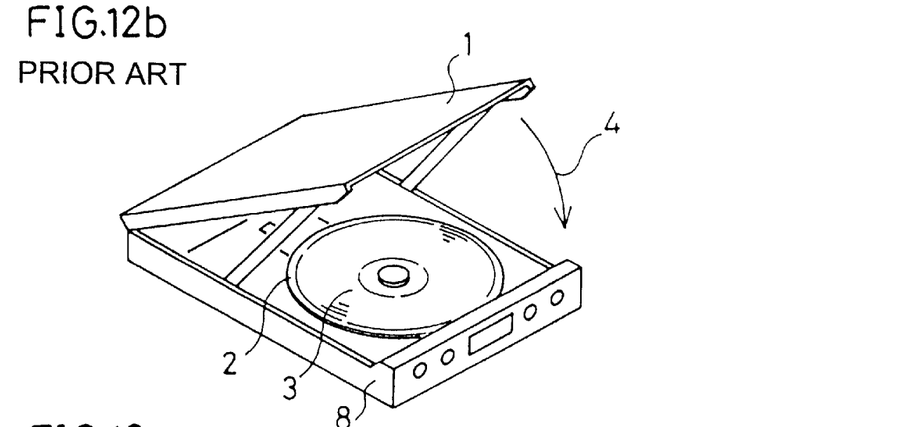
Figure 12C:
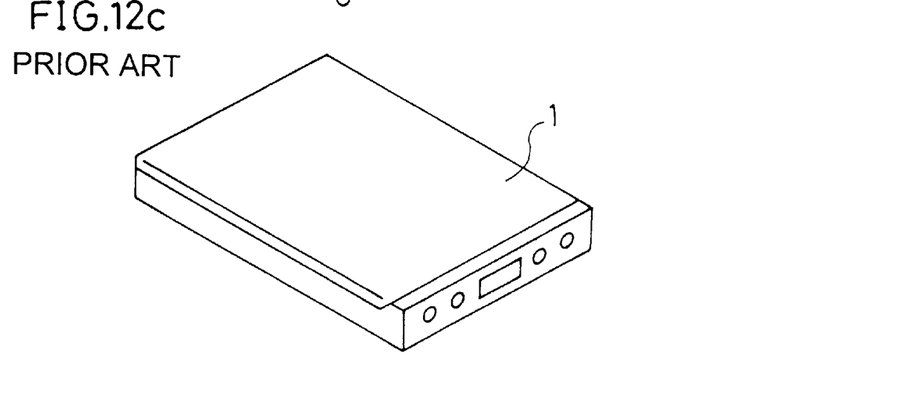

A conventional recording and reproducing device used for cartridge-less disks is so designed that an upper cover 1 is opened as shown in FIG. 12a to set a CD 3 directly in a loading section 2 as shown in FIG. 12b, and the upper cover 1 is closed by being turned in the direction of arrow 4 as shown in FIG. 12c, in which state a CD 3 is recorded or reproduced.

Figure 13A:
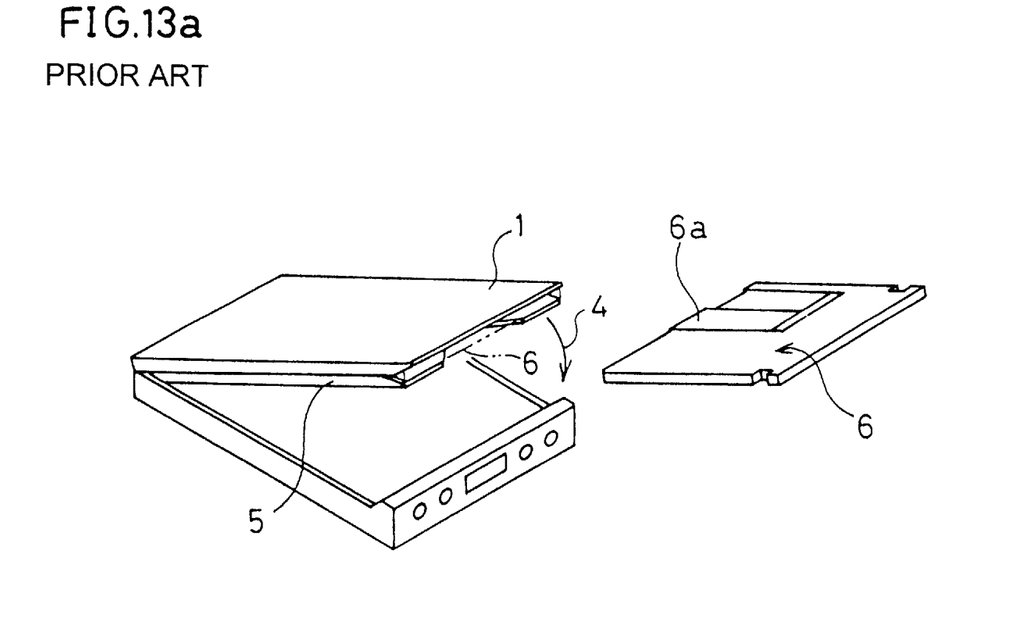
FIGS. 13a–13b are views for explaining successive loading steps in a conventional recording and reproducing device used exclusively for cartridge disks.
Figure 13B:
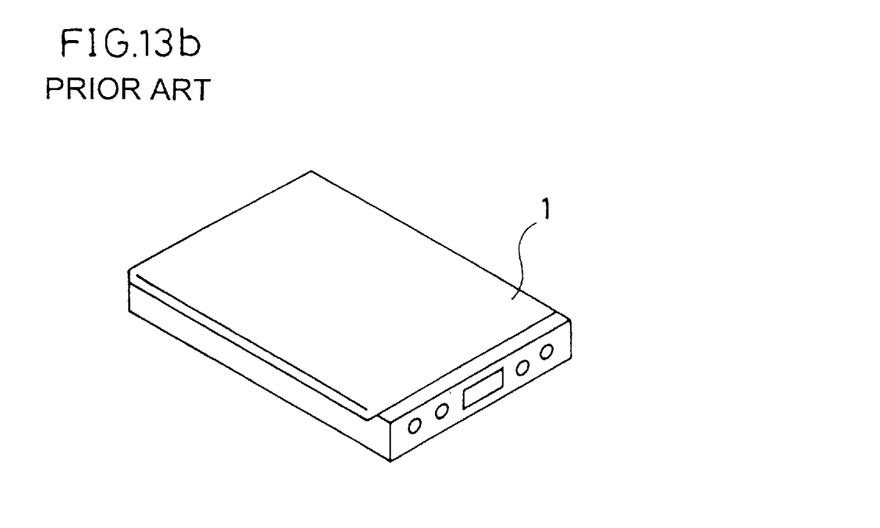

A conventional recording and reproducing device used for cartridge disks comprises a cartridge holder 5 attached to the back of an upper cover 1 as shown in FIG. 13a, the arrangement being such that a cartridge 6 is set in said cartridge holder 5 as shown by phantom lines, whereupon the upper cover 1 is turned in the direction of arrow 4 to its closed position as shown in FIG. 13b, in which state recording or reproducing is effected.

Figure 14:
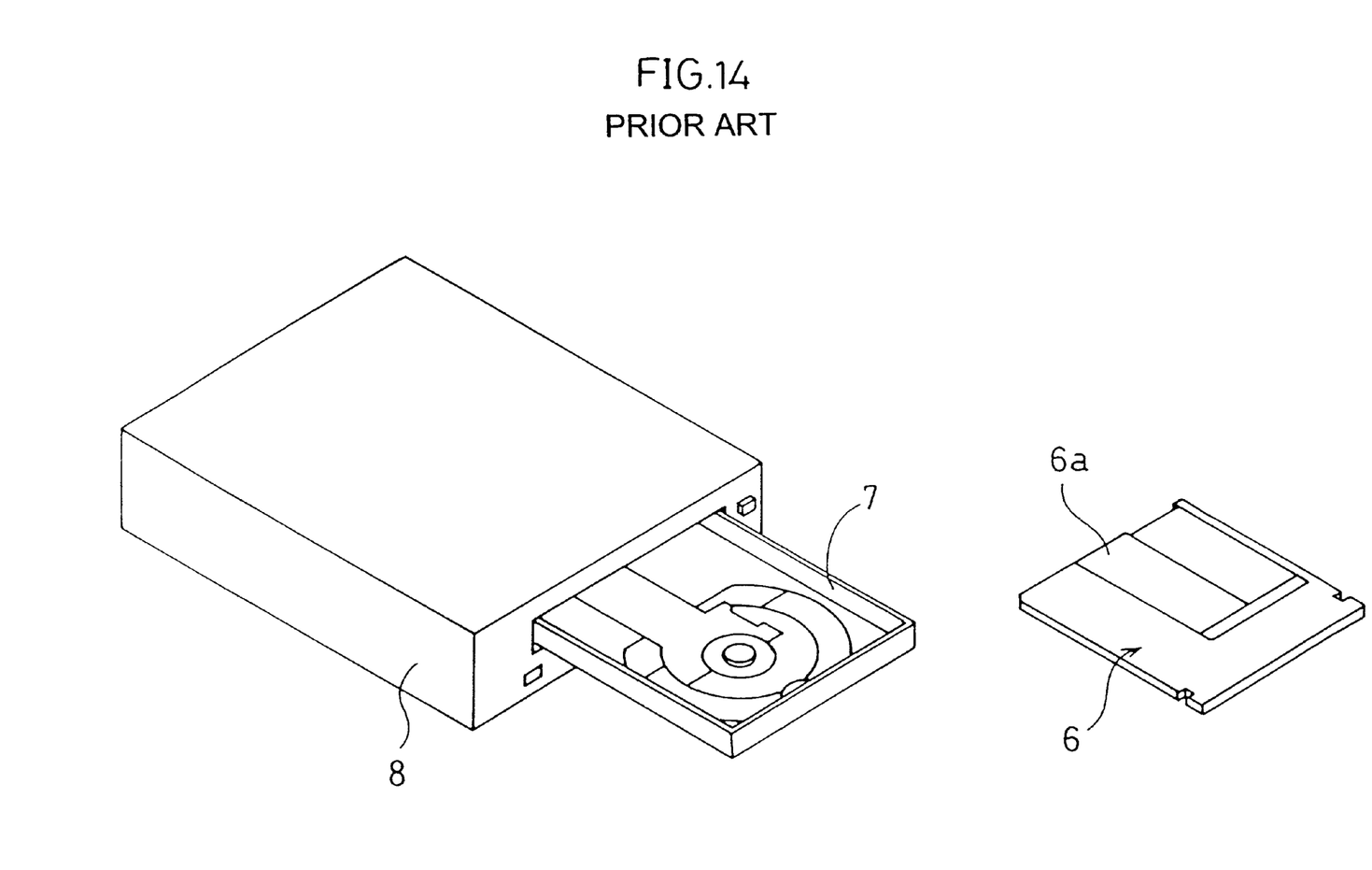
FIG. 14 is a view for explaining a loading step in a conventional recording and reproducing device which can be used for both cartridge-less and cartridge disks.

Further, a recording and reproducing device which can be used for both cartridge and cartridge-less disks is so designed that a disk in the form of either a CD 3 or a cartridge 6 is set on a linear slide type tray 7 drawn out of the main body of the device as shown in FIG. 14 and then the tray 7 is retracted into the main body 8 to effect recording or reproducing.

As personal computers, particularly notebook-sized personal computers, have come into wide use, there is a demand in the market for the reduction in size and weight of recording and reproducing devices used as peripheral equipments for notebook-sized personal computers.

Although the recording and reproducing device which employs the linear slide type tray 7 shown in FIG. 14 can be used for both cartridge and cartridge-less disks, the driving mechanism for the tray 7 is complicated, posing a problem that it is impossible to reduce the size and weight of the device.

Thus, it is necessary to develop a recording and reproducing device of the type which can be easily reduced in size and weight as shown in FIGS. 12a–12c or FIGS. 13a and 13b, and which can be used for both cartridge and cartridge-less disks.

If, however, the device constructed as shown in FIGS. 12a–12c is employed as a recording and reproducing device for both cartridge and cartridge-less disks, it becomes difficult to open or close the shutter 6a. Further, if the device arranged as shown in FIGS. 13a and 13b is employed, though the opening and closing of the shutter 6a of the cartridge 6 is easy, there will arise a problem that if a cartridge-less disk, more specifically a CD 3, is set in the cartridge holder 5, it is difficult to align the CD 3 with the rotational driving device when the upper cover 1 is closed.

The present invention solves the above problems and has an object to provide a recording and reproducing device which can be used for both cartridge and cartridge-less disks and reduced in size and weight, and is capable of aligning a cartridge-less disk.

DISCLOSURE OF THE INVENTION

A recording and reproducing device according to the present invention is characterized in that a disk holder is internally provided on one and the other sides thereof with positioning means adapted to abut against a cartridge-less disk set in the disk holder to prevent it from moving to the innermost region of the disk holder and align it in a position corresponding to said rotational driving device.

A recording and reproducing device according to a first aspect of the present invention is a recording and reproducing device used for recording information in and reproducing information from a cartridge disk or a cartridge-less disk, characterized in that said device comprises a disk holder installed on the main body of the device which has a rotational driving device and a recording and reproducing head housed therein, said disk holder being pivotally supported at its innermost region so that a disk set therein can be moved between a recording and reproducing mount position and an exchange position, and positioning means adapted to abut against a cartridge-less disk set in said disk holder to prevent it from moving to the innermost region of the disk holder and align it in a position corresponding to said rotational driving device and also adapted to abut against a cartridge disk set in the disk holder to move it to a retracted position.

Further, a recording and reproducing device according to the present invention is characterized in that the disk holder is internally provided on one side thereof with a shutter operating lever adapted to abut against a cartridge disk set in the disk holder so that the insertion of said cartridge causes said lever to turn in the direction to open the shutter, the disk holder is also internally provided on one and the other sides thereof with positioning means adapted to abut against a cartridge-less disk set in the disk holder to prevent it from moving to the innermost region of the disk holder and align it in a position corresponding to said rotational driving device. And said shutter operating lever is integrally formed at its intermediate portion with positioning means adapted to abut against a cartridge-less disk set in the disk holder to prevent it from moving to the innermost region of the disk holder and align it in a position corresponding to said rotational driving device.

This invention is further characterized as follows. First, the disk holder comprises a holder tray for receiving a cartridge-less disk and a cartridge holder for receiving a cartridge disk.

Further, another characteristic feature is that a cover for opening and closing the upper surface of said main body is pivotally supported at one end thereof on the main body of the device, and the disk holder, when turned to the recording and reproducing mount position, is positioned in a space defined by the main body and the cover in the closed position, whereas the disk holder, when turned to the exchange position, is positioned intermediate between the main body and the cover in the opened position.

Further, another characteristic feature is that it is so arranged that a disk is held between a damper and a turntable of a rotational driving device, and that said device includes a clamp arm pivotally supported at one end thereof on the disk holder and being attached with said clamper, the other end of said clamp arm being engaged with the other end of said cover so that said holding is cancelled in linkage with the opening of the cover.

A recording and reproducing device according to a second aspect of the invention comprises a disk holder installed on the main body of the device which has a rotational driving device and a recording and reproducing head housed therein, said disk holder being turnable so that a disk set therein can be moved between a recording and reproducing mount position and an exchange position, said recording and reproducing head having electronic parts mounted thereon including a recording and reproducing laser diode, said electronic parts being connected in parallel with a protective circuit when said disk holder is deviated from the recording and reproducing mount position. The protective circuit may be a switch contact which is rendered conductive when the disk holder is deviated from the recording and reproducing mount position.

As described above, the recording and reproducing device of the present invention comprises a disk holder installed on the main body of the device which has a rotational driving device and a recording and reproducing head housed therein, said disk holder being pivotally supported at its innermost end region so that a disk set therein can be moved between a recording and reproducing mount position and an exchange position, and positioning means adapted to abut against a cartridge-less disk set in the disk holder to prevent it from moving to the innermost region of the disk holder and align it in a position corresponding to said rotational driving device and also adapted to abut against a cartridge disk set in the disk holder to move it to a retracted position. As a result, both cartridge and cartridge-less disks can be used, and in addition, a superior recording and reproducing device can be provided which is reduced in size and weight and which is capable of aligning a cartridge-less disk.

Further, the device of the present invention comprises a disk holder installed on the main body of the device which has a rotational driving device and a recording and reproducing head housed therein, said disk holder being turnable so that a disk set therein can be moved between a recording and reproducing mount position and an exchange position, said recording and reproducing head having recording and reproducing electronic parts mounted thereon, whereby said electronic parts is connected in parallel with a protective circuit when the disk holder is deviated from the recording and reproducing mount position. As a result, the reliability of the device can be improved as to protection against electrostatic discharge damage due to erroneous operation.

PREFERRED EMBODIMENTS (Embodiment 1)

FIGS. 1–8b show a recording and reproducing device according to the present invention.

Figure 1:
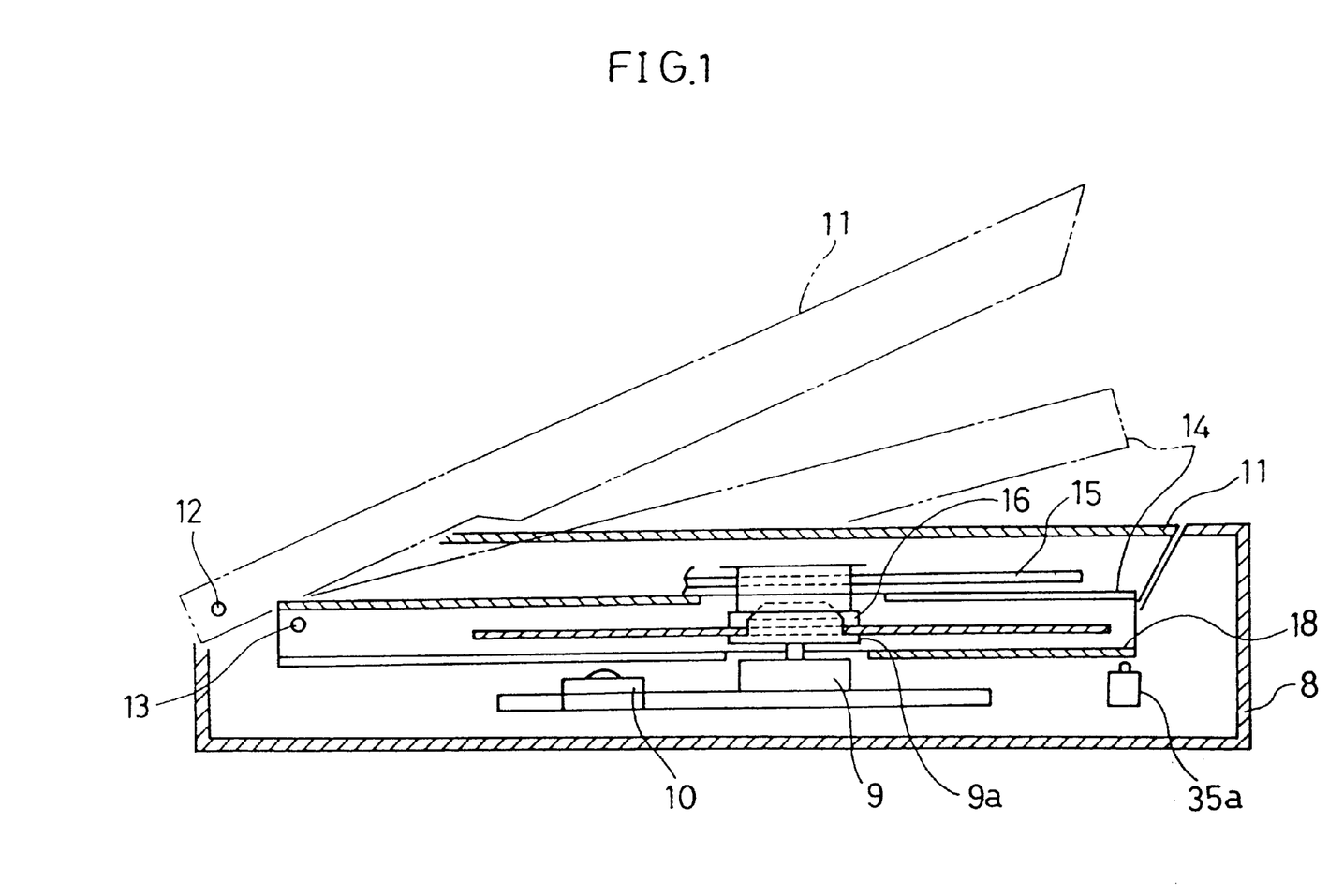
FIG. 1 is a sectional view showing the arrangement of an embodiment 1 of the present invention.

As shown in FIG. 1, the main body 8 of the device has a rotational driving device 9 and a recording and reproducing head 10 housed therein. A cover 11 for opening and closing the upper surface of the main body 8 is pivotally supported at one end thereof on the main body 8 at a pivot 12. Solid lines indicate the loading state with the upper surface of the main body 8 closed, while phantom lines indicate the exchange state with the upper surface of the main body 8 opened.

Further, a disk holder 14 pivotally supported at its innermost region by a pivot 13 is attached to said main body 8 such that it is turnable between a recording and reproducing mount position shown by solid lines and an exchange position shown by phantom lines.

Figure 2:
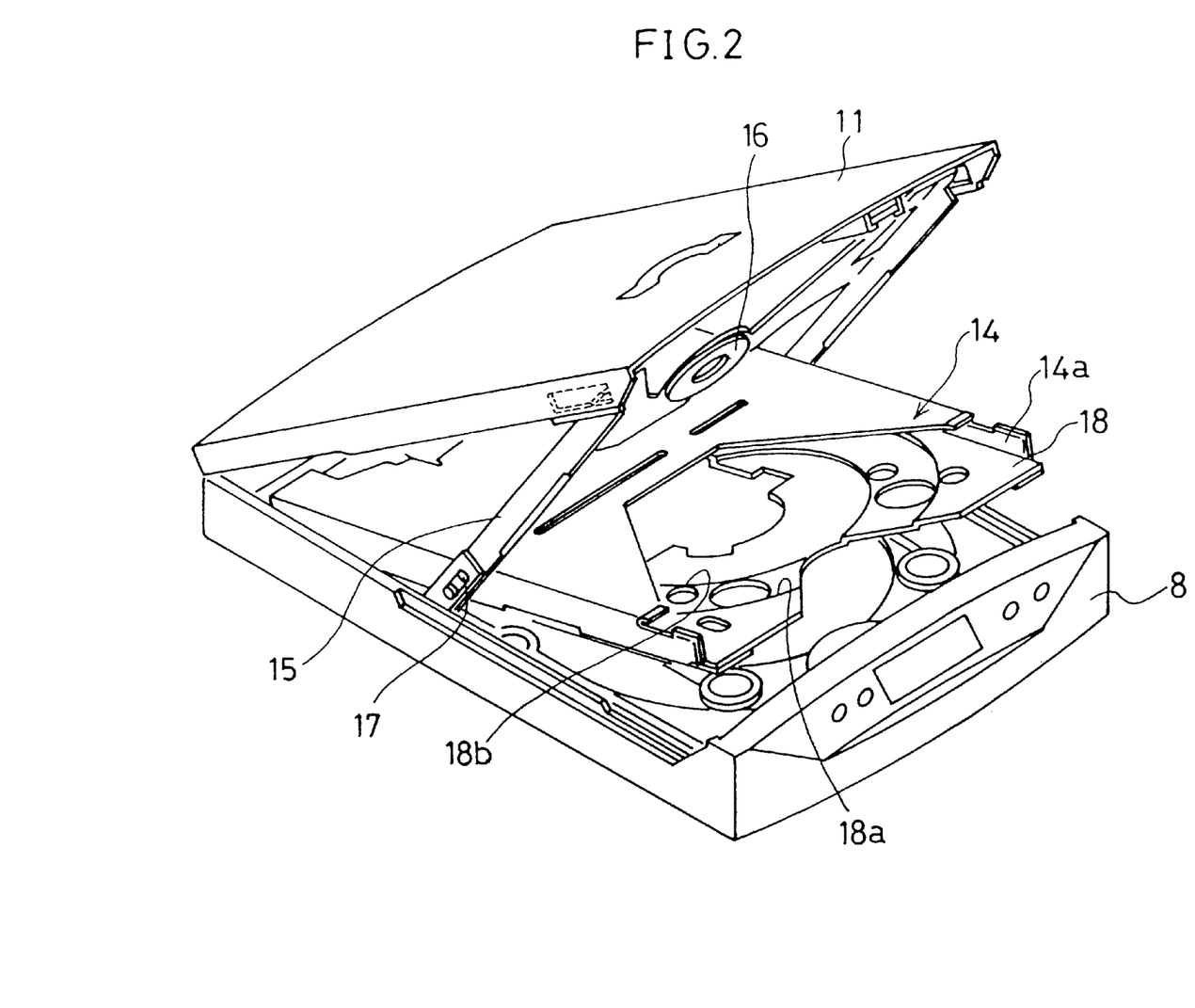
FIG. 2 is a perspective view showing the exchange state in said embodiment.
Figure 3:
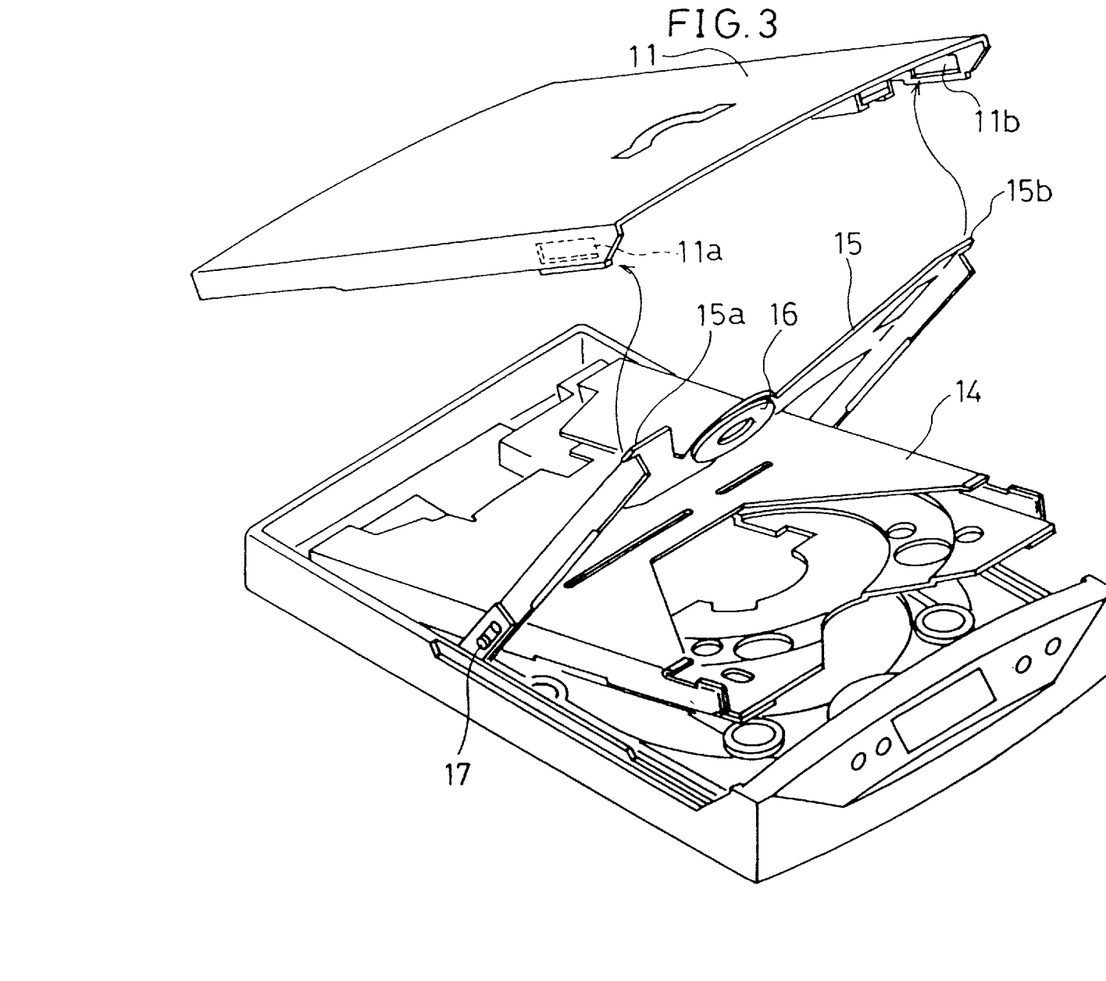
FIG. 3 is an exploded perspective view with the cover of said embodiment removed.

The numeral 15 denotes a clamp arm 15 having a damper 16 attached thereto, said damper 16 having a magnet housed therein which is capable of attracting the turntable 9a of the rotational driving device 9, said clamp arm 15 being connected at its opposite sides in the innermost region thereof to the disk holder 14 by pins 17 (see FIGS. 2 and 3). The opposite sides 15a, 15b of the front of this clamp arm 15 are engaged with engagement portions 11a, 11b disposed on the inner side of the front of the cover 11 as shown in FIG. 3, so that the opening of the cover 11 into the exchange state shown in FIG. 2 causes the clamp arm 15 to position the disk holder 14 intermediate between the main body 8 and the cover 11 which is in the opened position.

The disk holder 14 comprises a cartridge holder 14a for receiving the cartridge 6 as a cartridge disk, and a holder tray 18 disposed in the opening in the bottom of the cartridge holder 14a. The holder tray 18 is formed with recesses 18a and 18b respectively of 12-cm diameter and 8-cm diameter.

Figure 4:
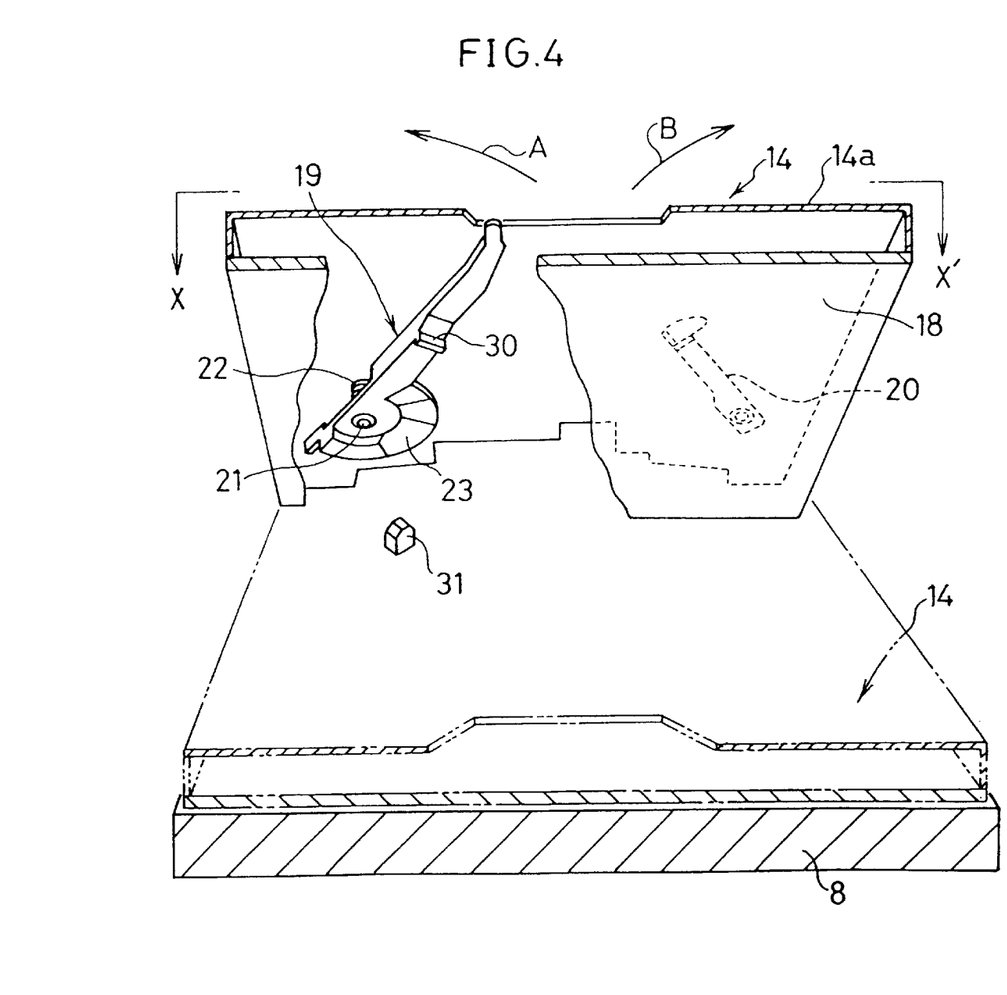
FIG. 4 is a schematic perspective view taken from the front of said embodiment showing the exchange state.
Figure 5:
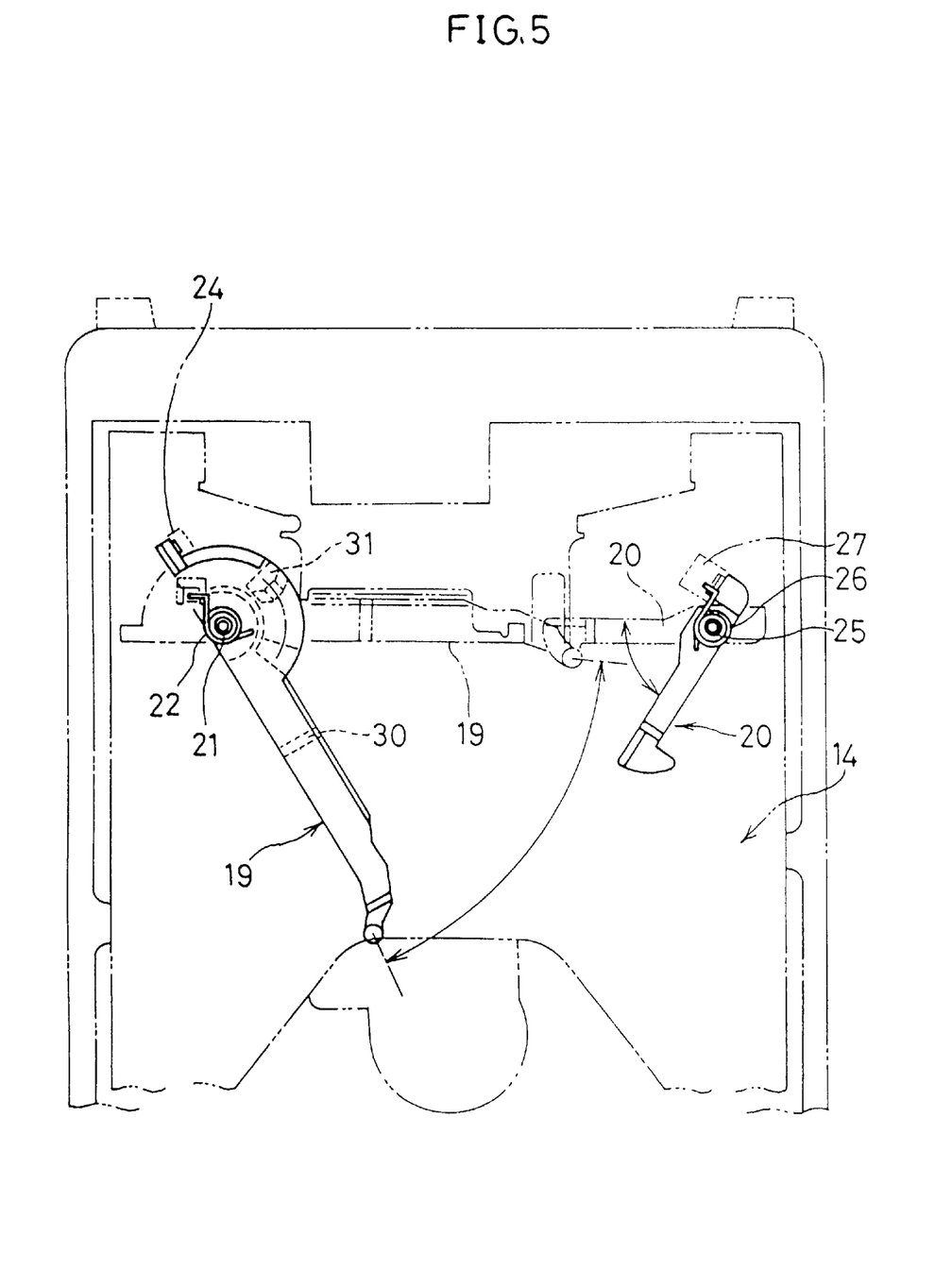
FIG. 5 is a plan view taken in the direction of arrow X–X' in FIG. 4.

Disposed between the holder tray 18 and the cartridge holder 14a opposed thereto are shutter opener lever 19 and a CD stopper 20, as shown in FIGS. 4 and 5.

The shutter opener lever 19 is pivotally supported at its proximal end by a shaft 21 and is urged in the direction of arrow A by a coil spring 22 until it abuts against a stopper 24, where it is stopped in the state shown in FIGS. 4 and 5. Further, the proximal end of the shutter opener lever 19 is formed with a cam surface 23.

The CD stopper 20 is pivotally supported at its proximal end by a shaft 25 and is urged in the direction of arrow B by a coil spring 26 until it abuts against a stopper 27, where it is stopped in the state shown in FIGS. 4 and 5.

Figure 6A:
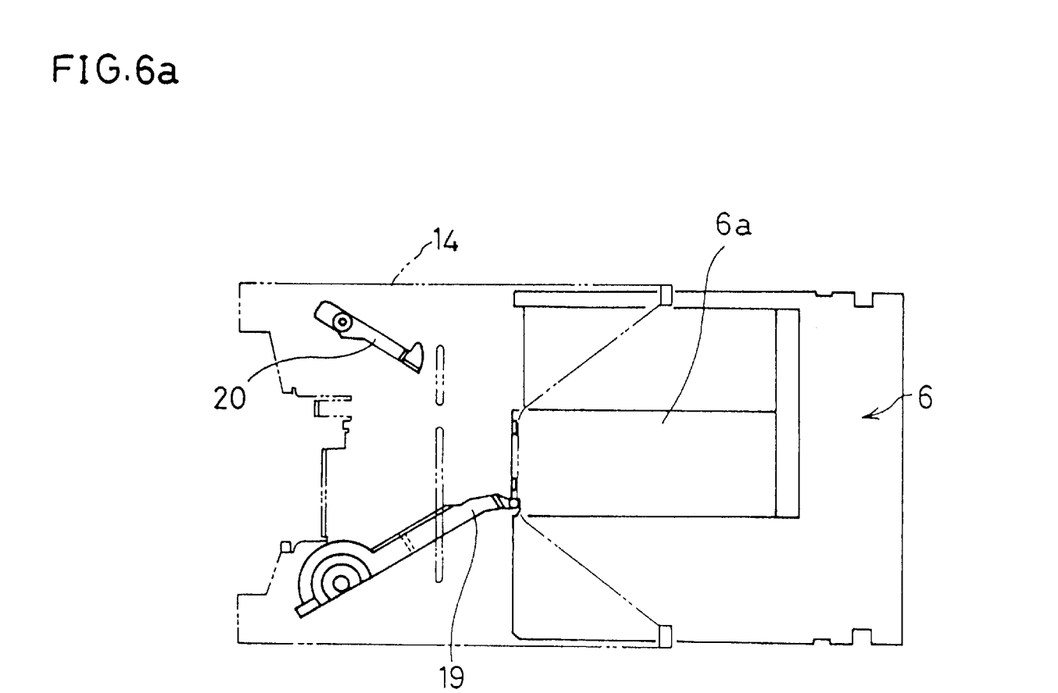
FIGS. 6a and 6b are plan views for explaining the steps of setting a cartridge disk in said embodiment.
Figure 6B:
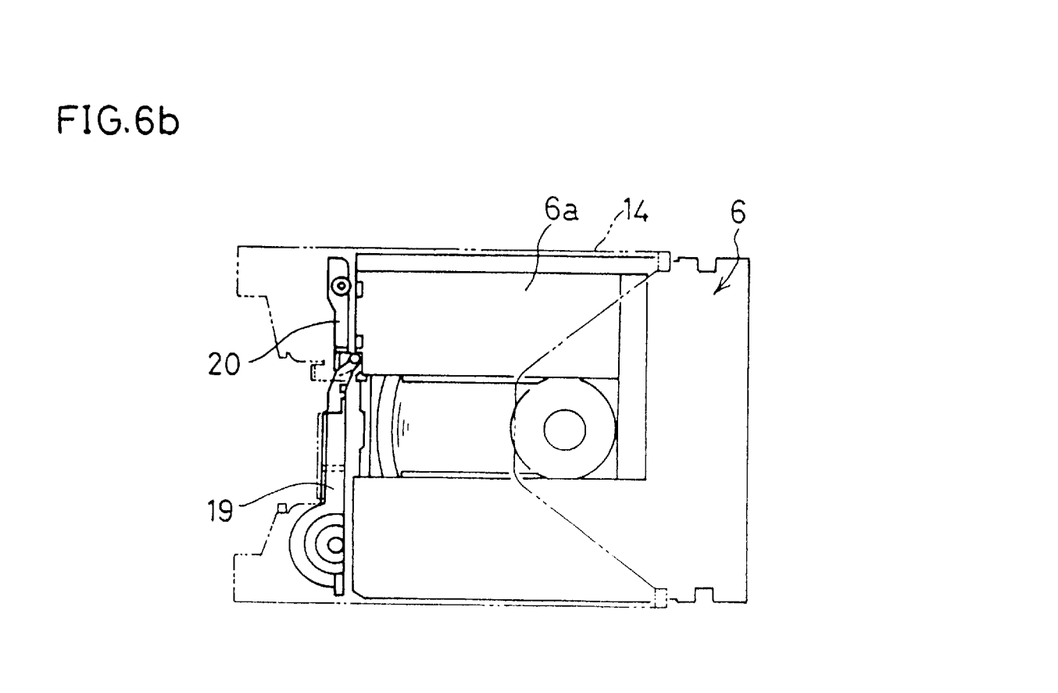

In this state (the exchange state shown in FIG. 2), a cartridge 6 for a cartridge disk is inserted in the cartridge holder 14a, the front end of the shutter opener lever 19 engages the shutter 6a of the cartridge 6 as shown in FIG. 6a. When the cartridge 6 is further inserted, the shutter opener lever 19 is turned against the urging force of the coil spring 22 to fully open the shutter 6a as shown in FIG. 6b. Further, the inserted cartridge 6 abuts against the front end of the CD stopper 20, turning it to the retracted position against the urging force of the coil spring 26.

In this state, when the front end of the cover 11 is pressed downward until it is closed, the cartridge holder 14a having the cartridge 6 set therein is turned to the recording and reproducing mount position, where the disk contained in the cartridge 6 is placed on the turntable 9a and the clamper 16 is attracted to the turntable 9a through the disk so that the latter is driven for rotation at high speed to effect recording or reproducing.

Figure 7A:
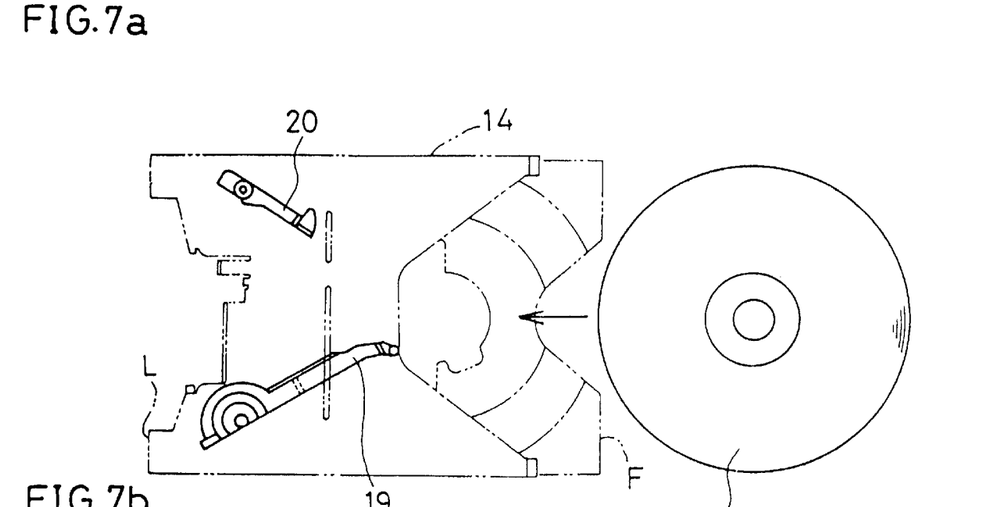
FIGS. 7a–7c are plan views for explaining the steps of setting a cartridge-less disk in said embodiment.

In the case where a CD 3 serving as a cartridge-less disk instead of a cartridge disk is inserted in the cartridge holder 14a, the state of the cartridge holder 14a prior to the insertion of the CD 3 is as shown in FIG. 7a such that the shutter opener lever 19 and the CD stopper 20 are stopped at positions where they abut against the stoppers 24 and 27, respectively.

Figure 7B:
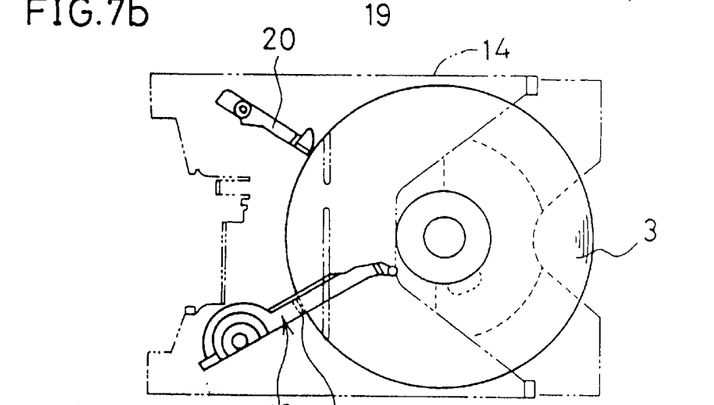

The CD 3 of 12 cm in diameter in the cartridge holder 14a is set in the recess 18a of the holder tray 18 as shown in FIG. 7b in the exchange state in which the disk holder 14 is inclined as shown in FIG. 2. In the case of a CD 3 of 8 cm in diameter, it is set in the recess 18b.

Figures 8A, 8B:
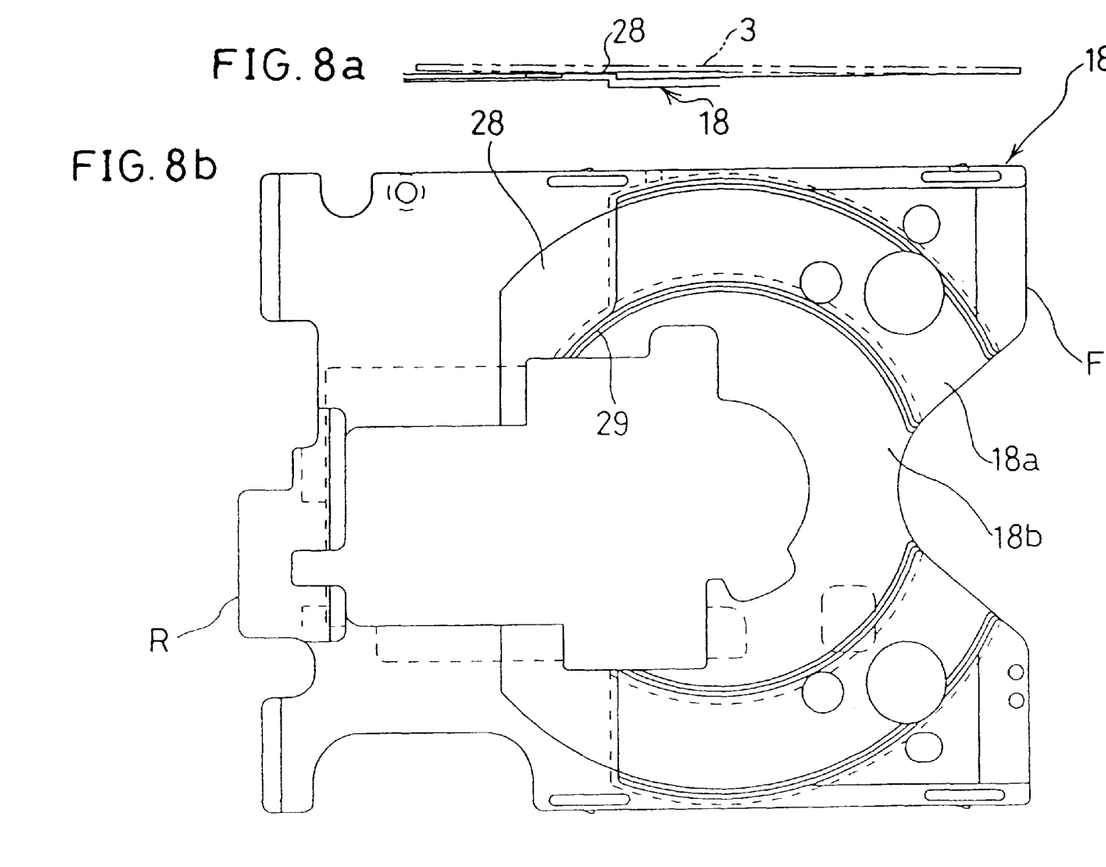
FIG. 8a is a side view of the principal portion of a holder tray in said embodiment.
FIG. 8b is a plan view of the holder tray in said embodiment.

In addition, the details of the shape of the recesses 18a and 18b of the holder tray 18 are as shown in FIGS. 8a and 8b. In FIG. 8b in which F denotes the front and R denotes the innermost side, the innermost side of the recess 18a is formed with an inclined surface 28 whose innermost side is raised. In the case of a CD 3 of 8 cm in diameter which is set in the recess 18b, it is held as it abuts against a step 29. In the case of a CD 3 of 12 cm in diameter which is set in the recess 18a, it runs on to the inclined surface 28 and slides downward to the innermost side of the disk holder 14 until it is held as it abuts against a step 30 formed in an intermediate portion of the shutter opener lever 19 as shown in FIG. 7b (shown in more detail in FIGS. 4 and 5) and also against the front end of the CD stopper 20.

Figure 7C:
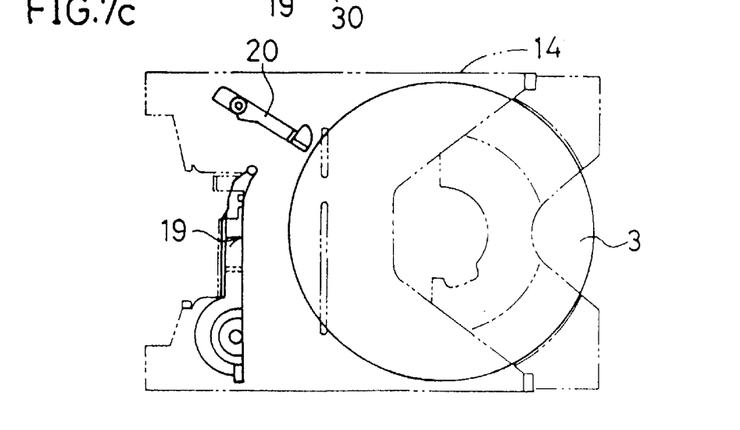
Figure 9A:
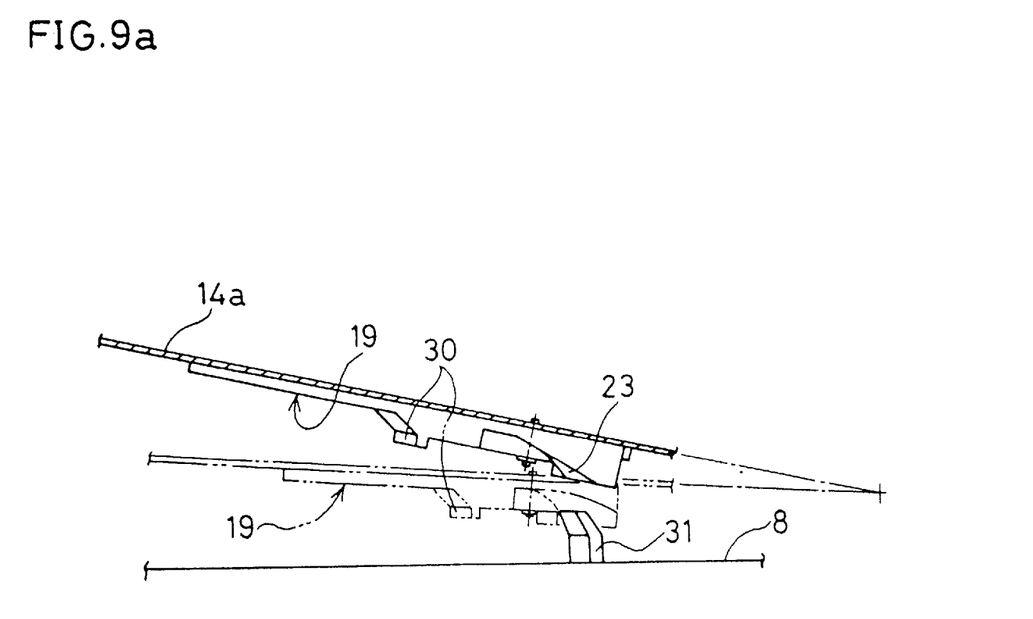
FIGS. 9a and 9b are side views showing the turning of a shutter opener lever when the cartridge holder in said embodiment is moved from the exchange position to the recording and reproducing mount position.
Figure 9B:
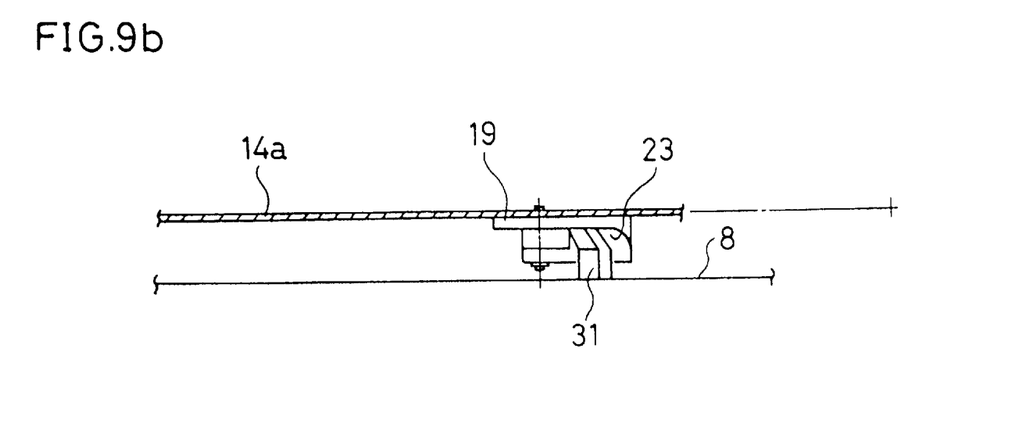

So as to correspond to the cam surface 23 of the shutter opener lever 19, a projection 31 is formed on the main body 8 as shown in FIGS. 4, 9a, 9b, so that when the cover 11 is pressed to move the cartridge holder 14 to the recording and reproducing mount position, the projection 31 on the fixed side abuts against the cam surface 23 as shown in FIG. 9a and the shutter opener lever 19 is turned to a standby position against the urging force of the coil spring 22 as shown in phantom lines in FIGS. 9b, 7c and 5.

In this closed state of the cover 11, the CD 3 of 12 cm in diameter is spaced from the holder tray 18 as it is placed on the turntable 9a while the clamper 16 is attracted to the turntable 9a through the CD 3, so that the CD 3 is driven for rotation at high speed for recording or reproducing.

Thus, a recording medium contained in the cartridge 6 can be used for recording information therein or reproducing information therefrom, and in the case where a CD 3 of 12 cm in diameter which differs in the type of recording medium is used, it has only to be placed on the holder tray 18, whereupon it is held in position while abutting against the step 30 of the shutter opener lever 19 and the front end of the CD stopper 20; in this manner, the center of the CD 3 can be set in line with the center of the turntable 9a.

Further, since the disk holder 14, when turned to the exchange position, is positioned intermediate between the main body 8 and the cover 11 in the opened position, the unnecessary friction between the recording surface of the CD 3 and the holder tray 18 involved in turning to the exchange position and to the loading position is eliminated, thus protecting the CD 3.

Figure 10:
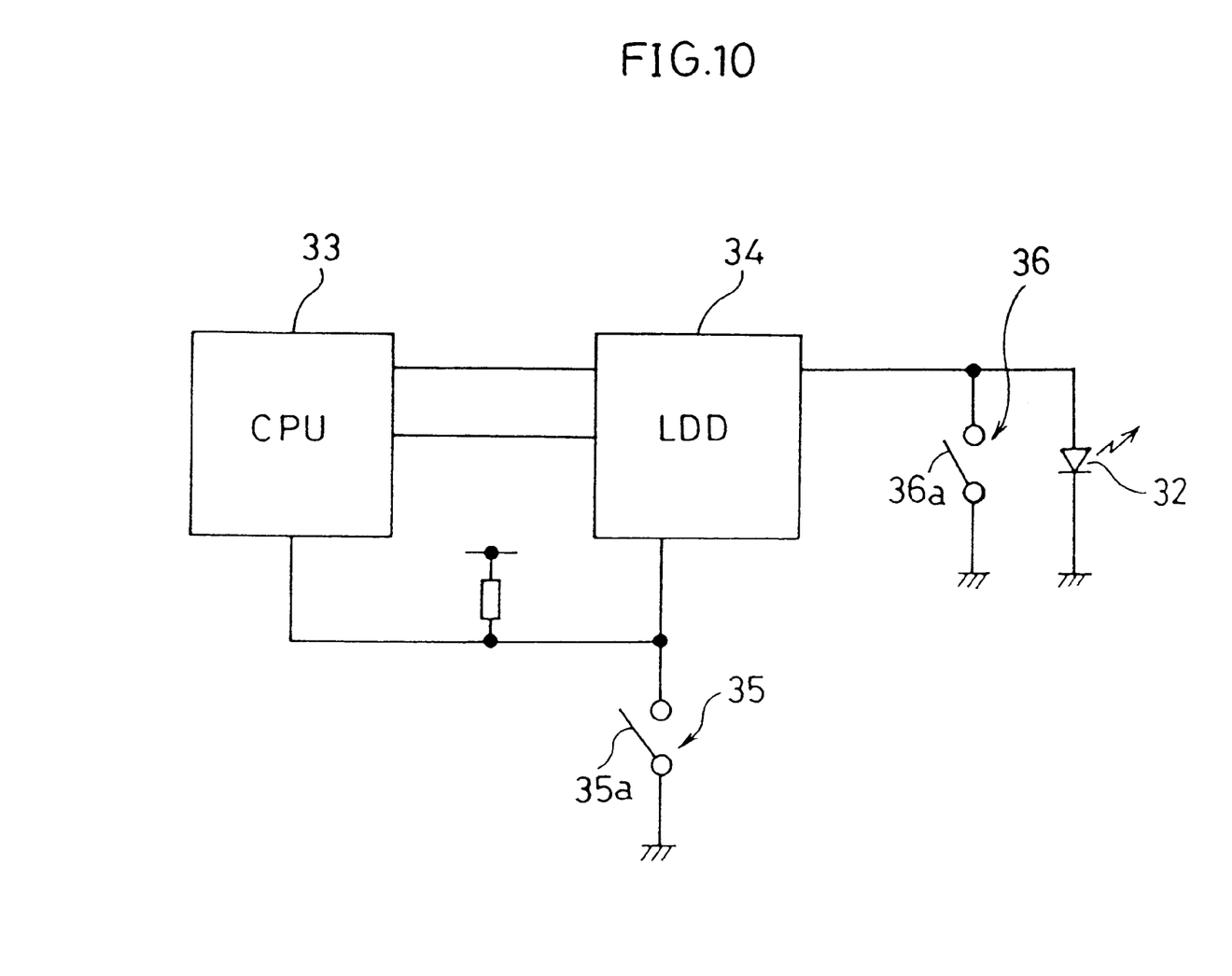
FIG. 10 is a circuit diagram showing a driving circuit for a semiconductor laser diode and a protective circuit therefor in said embodiment.

Further, in this embodiment 1, in order to protect the electronic parts, particularly the semiconductor laser diode 32 in the recording and reproducing head 10 as shown in FIG. 10, from electrostatic discharge damage, the following arrangement is provided. A microcomputer 33 shown in FIG. 10 drives the semiconductor laser diode 32 through a driving circuit 34. A first switch 35 is used to detect the closing of the cover 11. More specifically as shown in FIG. 1, a microswitch 35a is attached to the main body 8 to detect the arrival of the holder tray 18 at the recording and reproducing mount position, establishing the make state, for example, to cause the driving circuit 34 to start driving the semiconductor laser diode 32. At this time, a second switch 36 connected in parallel to the semiconductor laser diode 32 is in the break state.

When the microswitch 35a detects the holder tray 18 being spaced from the recording and reproducing mount position, the driving circuit 34 stops driving the semiconductor laser diode 32. When the cover 11 is sufficiently opened to allow the user's hand to approach the recording and reproducing head 10, the microswitch 36a serving as the second switch 36 has already been switched over to the make state, short-circuiting the terminals of the semiconductor laser diode 32, thereby protecting the semiconductor laser diode 32 against dielectric breakdown due to static electricity.

In this embodiment, a concrete example of deviation from the recording and reproducing mount position is as follows: the changeover of the microswitches 35a and 36a is effected during the period extending from the time the disk holder 14 is deviated from the recording and reproducing mount position to the time it reaches the exchange position. More specifically, the changeover of the microswitches 35a and 36a is effected immediately after the disk holder 14 is deviated from the recording and reproducing mount position.

In addition, in this embodiment, microswitches 35a and 36a have been used as examples of the first and second switches 35 and 36; however, other switch means may be used.

(Embodiment 2)

Figure 11A:
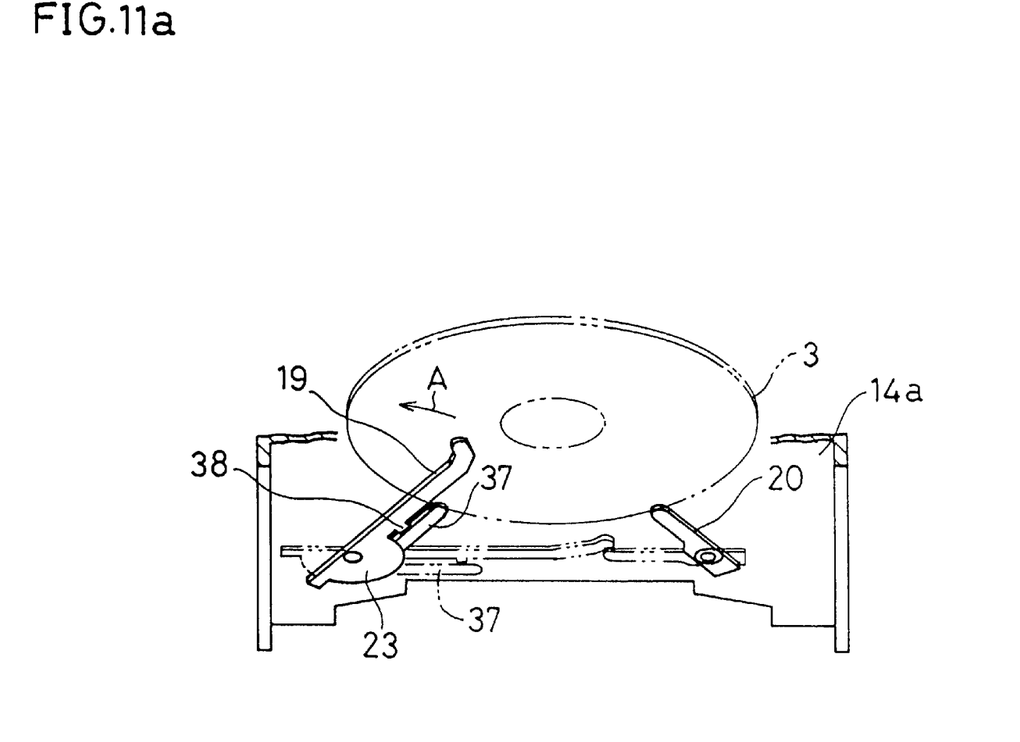
FIGS. 11a and 11b are views for explaining an embodiment 2.
Figure 11B:
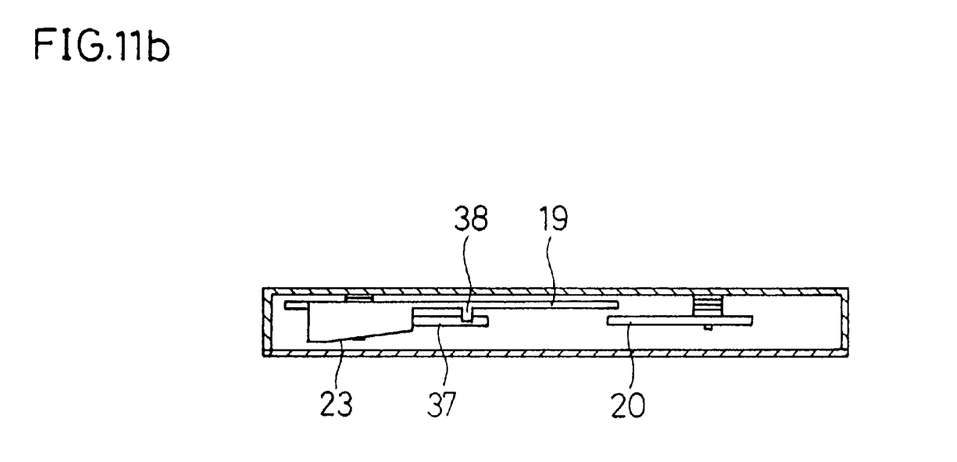

FIGS. 11a and 11b show the principal portion of an embodiment 2.

In the embodiment 1, the step 30 is provided in an intermediate portion of the shutter opener lever 19 to support the CD 3. In this embodiment 2, however, instead of providing the step 30 in an intermediate portion of the shutter opener lever 19, a CD stop 37 is provided coaxially with the shutter opener lever 19.

FIG. 11a is a schematic view, taken from the front as in FIG. 4 of the embodiment 1, showing the disk holder 14 in the exchange position. FIG. 11b is a schematic view, taken from the front, showing the disk holder 14 in the recording and reproducing mount position.

The shutter opener lever 19 and the CD stop 37 are urged in the direction of arrow A by coil spring means (not shown), so that moving the cartridge holder 14a to the recording and reproducing mount position causes the shutter opener lever 19 to be turned against said urging force by the interaction between the cam surface 23 of the shutter opener lever 19 and said projection 31, until the projection 38 on the shutter opener lever 19 engages the CD stop 37 to turn the latter to the retracted position.

What is claimed is:

1. A recording and reproducing device for recording information in and reproducing information from a cartridge disk or a cartridge-less disk, comprising:

a disk holder installed on the main body of a device that has a rotational driving device and a recording and reproducing head housed therein, said disk holder being pivotally supported at its innermost region so that a disk set therein can be moved between a recording and reproducing mount position and an exchange position; and positioning lever means adapted to abut against a cartridge-less disk set in said disk holder to prevent it from moving to the innermost region of the disk holder and align it in a position corresponding to said rotational driving device and also adapted to abut against a cartridge of a cartridge disk set in the disk holder to move it to a retracted position.

2. A recording and reproducing device as set forth in claim 1, wherein said recording and reproducing head has recording and reproducing electronic parts mounted thereon, so that when the disk holder holding a disk is deviated from the recording and reproducing mount position, a protective circuit connected in parallel to said electronic parts operates to protect said electronic parts.

3. A recording and reproducing device as set forth in claim 1, wherein the disk holder comprises a holder tray for receiving a cartridge-less disk and a cartridge holder for receiving a cartridge disk.

4. A recording and reproducing device for recording information in and reproducing information from a cartridge disk or a cartridge-less disk, comprising:

a disk holder installed on the main body of the device that has a rotational driving device and a recording and reproducing head housed therein, said disk holder being pivotally supported at its innermost region so that a disk set therein can be moved between a recording and reproducing mount position and an exchange position;

a shutter operating lever provided on one side of the interior of the disk holder, said shutter operating lever being adapted to abut against a shutter of the cartridge disk set in the disk holder so that the insertion of said cartridge causes said shutter operating lever to turn in a direction to open the shutter of said cartridge; and positioning lever means provided on one and the other sides of the interior disk holder, said positioning lever means being adapted to abut against a cartridge-less disk set in the disk holder to prevent it from moving to the innermost region of the disk holder and align it in a position corresponding to said rotational driving device; wherein said shutter operating lever is integrally formed at its intermediate portion with said positioning lever means.

5. A recording and reproducing device as set forth in claim 4, wherein a cover for opening and closing an upper surface of the main body is pivotally supported at one end thereof on the main body of the device that has a rotational driving device and a recording and reproducing head housed therein, so that the disk holder, when turned to the recording and reproducing mount position, is positioned in a space defined by the main body and the cover in the closed position, wherein the disk holder, when turned to the exchange position, is positioned intermediate between the main body and the cover in the opened position.

6. A recording and reproducing device as set forth in claim 4, wherein a disk is held between a damper and a turntable of the rotational driving device, and wherein said recording and reproducing device includes a clamp arm pivotally supported at one end thereof on the disk holder and being attached with said damper, the other end of said clamp arm being engaged with the other end a cover so that said holding is cancelled in linkage with the opening of the cover.

7. A recording and reproducing device, comprising:

a disk holder installed on the main body of the device having a rotational driving device and a recording and reproducing head housed therein, said disk holder set therein including a disk being movable between a recording and reproducing mount position and an exchange position; and a recording and reproducing laser diode mounted on said recording and reproducing head, said laser diode being connected in parallel with a protective circuit so that the protective circuit protects the laser diode when said disk holder is deviated from the recording and reproducing mount position.

8. A recording and reproducing device as set forth in claim 7, wherein the protective circuit comprises a switch contact that is rendered conductive when the disk holder is deviated from the recording and reproducing mount position.

* * * * *